United States Patent
Blomberg

[15] 3,686,870
[45] Aug. 29, 1972

[54] ARRANGEMENT IN FLEXIBLE FENCES FOR ENCLOSING IMPURITIES FLOATING ON WATER

[72] Inventor: Erling G. E. Blomberg, Vastergatan 3 A 411, 23 Goteborg, Sweden

[22] Filed: Oct. 24, 1969

[21] Appl. No.: 869,153

[30] Foreign Application Priority Data

| Oct. 24, 1968 | Sweden | 14366/68 |
| Feb. 12, 1969 | Sweden | 1893/69 |
| July 4, 1969 | Sweden | 9557/69 |

[52] U.S. Cl. .....................61/1 F, 61/5, 210/DIG. 21
[51] Int. Cl. ..........................E02b 15/04, E02b 3/04
[58] Field of Search ...................61/1, 5; 210/242

[56] References Cited

UNITED STATES PATENTS

| 3,348,690 | 10/1967 | Cornelissen | 210/242 |
| 3,499,290 | 3/1970 | Smith | 61/1 |

FOREIGN PATENTS OR APPLICATIONS

| 1,305,469 | 8/1962 | France | 61/1 |
| 1,528,855 | 5/1968 | France | 61/1 |
| 829,756 | 3/1960 | Great Britain | 61/1 |
| 54,003 | 6/1922 | Sweden | 61/1 |

*Primary Examiner*—David J. Williamowsky
*Assistant Examiner*—David H. Corbin
*Attorney*—Linton & Linton

[57] ABSTRACT

A slick confining boom having an elongated flexible body means with upwardly extending portion to which floats are attached supporting said portion above the surface of a body of water and a downwardly extending portion to which weights are attached to extend said second portion below said water surface, a stress relieving rope connected at spaced apart intervals along said body means by connecting means extending laterally of said body means whereby said boom will retain impurities floating on said water surface.

10 Claims, 35 Drawing Figures

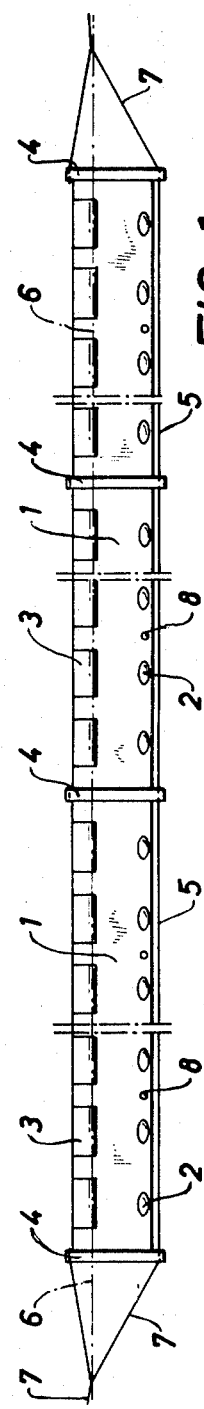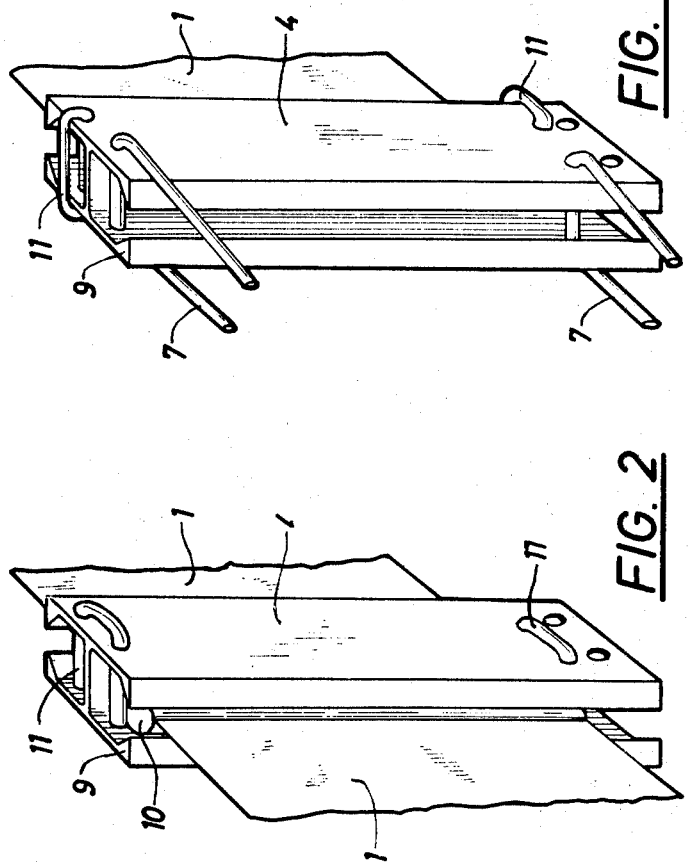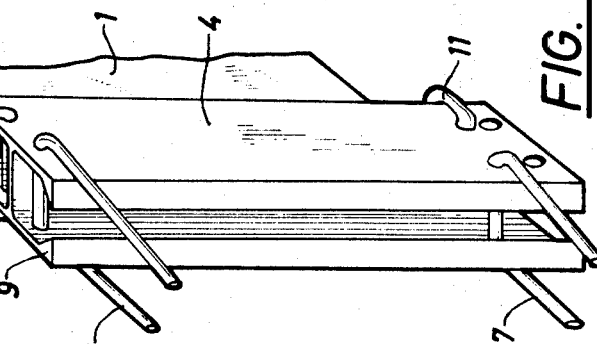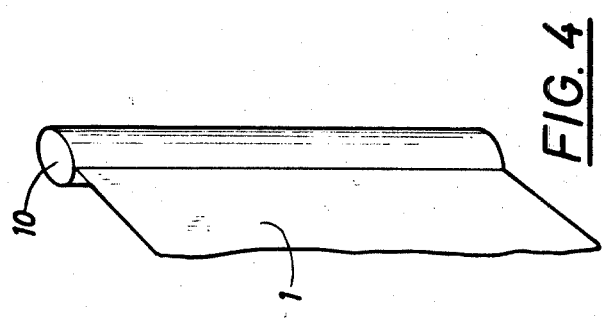

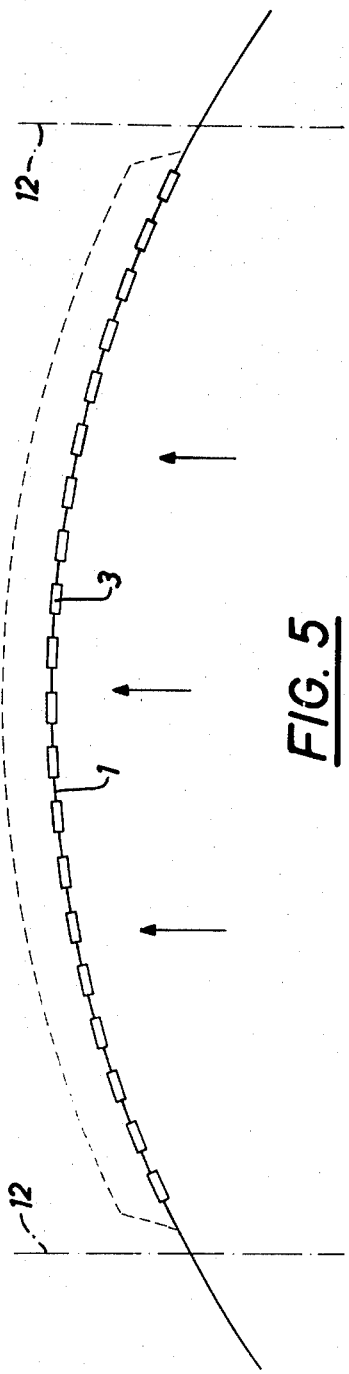
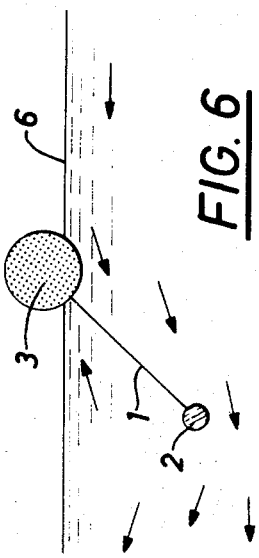
FIG. 5
FIG. 6

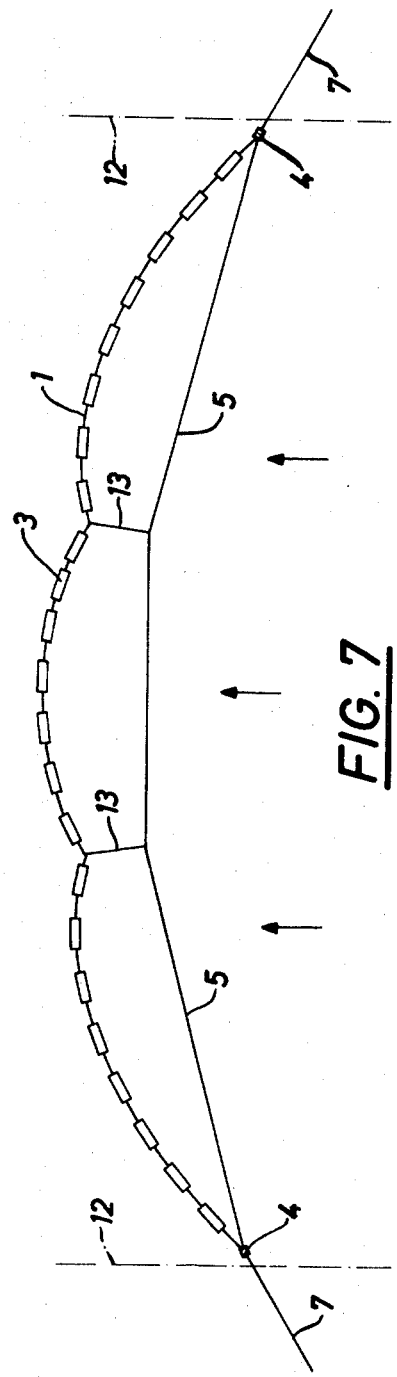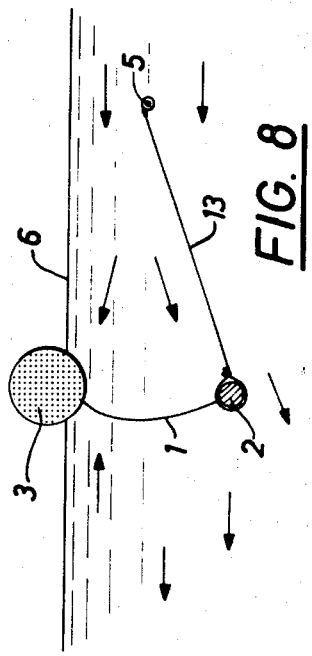

INVENTOR
GOTE EINAR ERLING BLOMBERG
BY
Linton and Linton
ATTORNEYS

INVENTOR
GOTE EINAR ERLING BLOMBERG
BY
Linton and Linton
ATTORNEYS

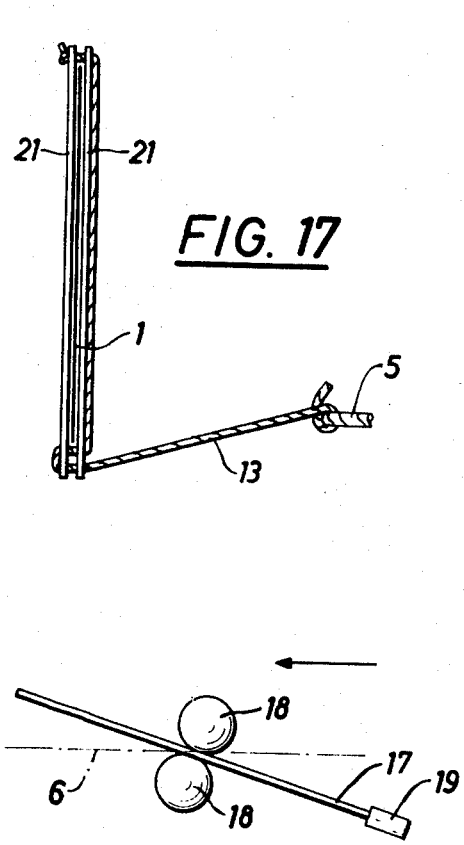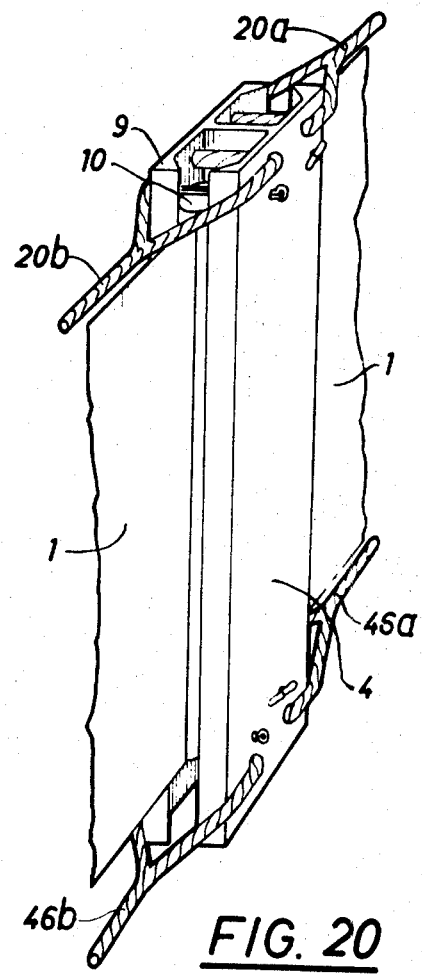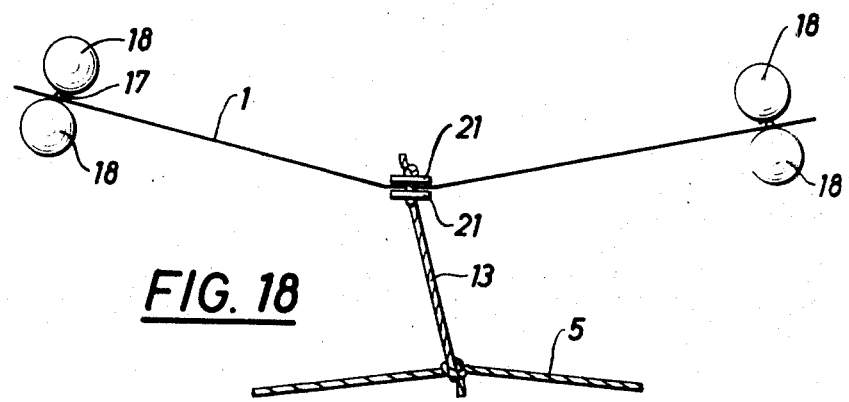

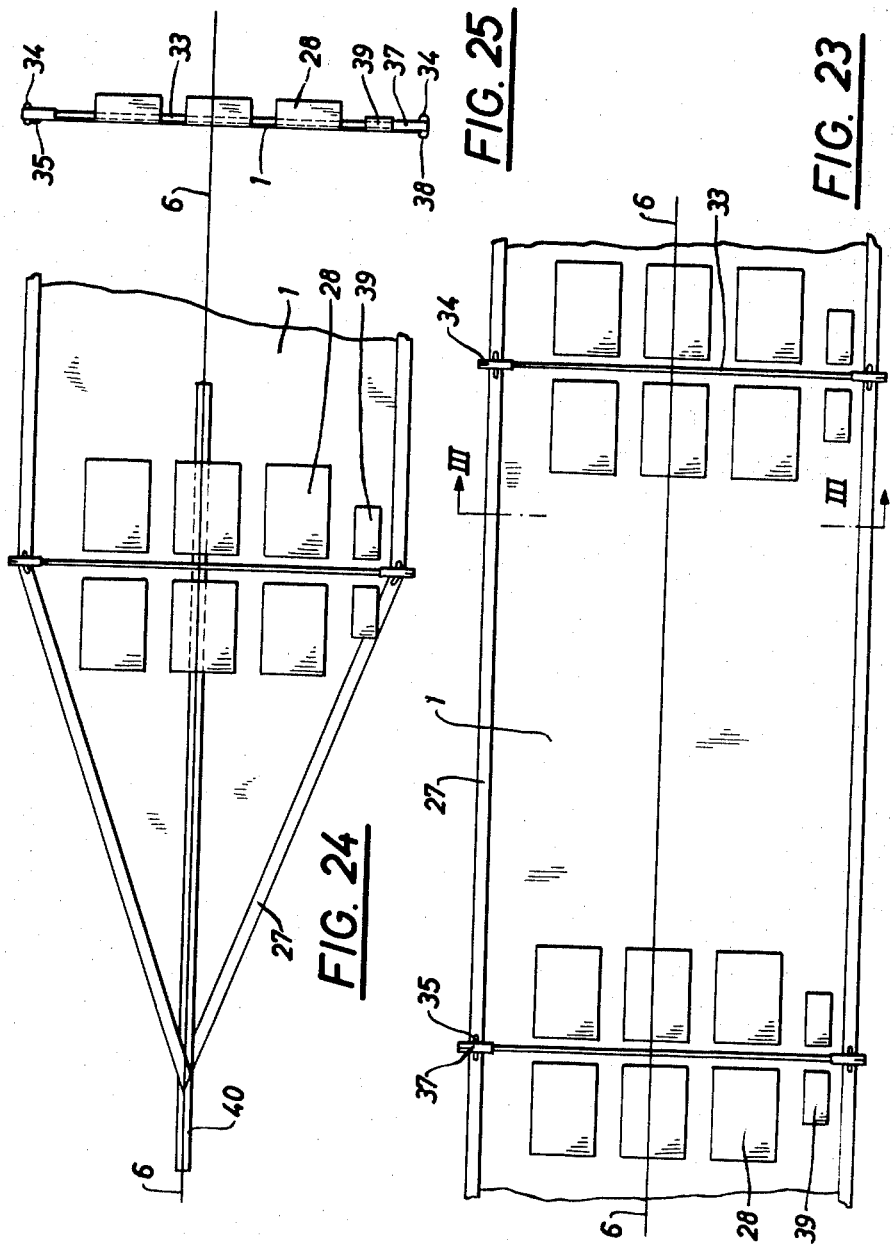

INVENTOR
GOTE EINAR ERLING BLOMBERG
BY
*Linton and Linton*
ATTORNEYS

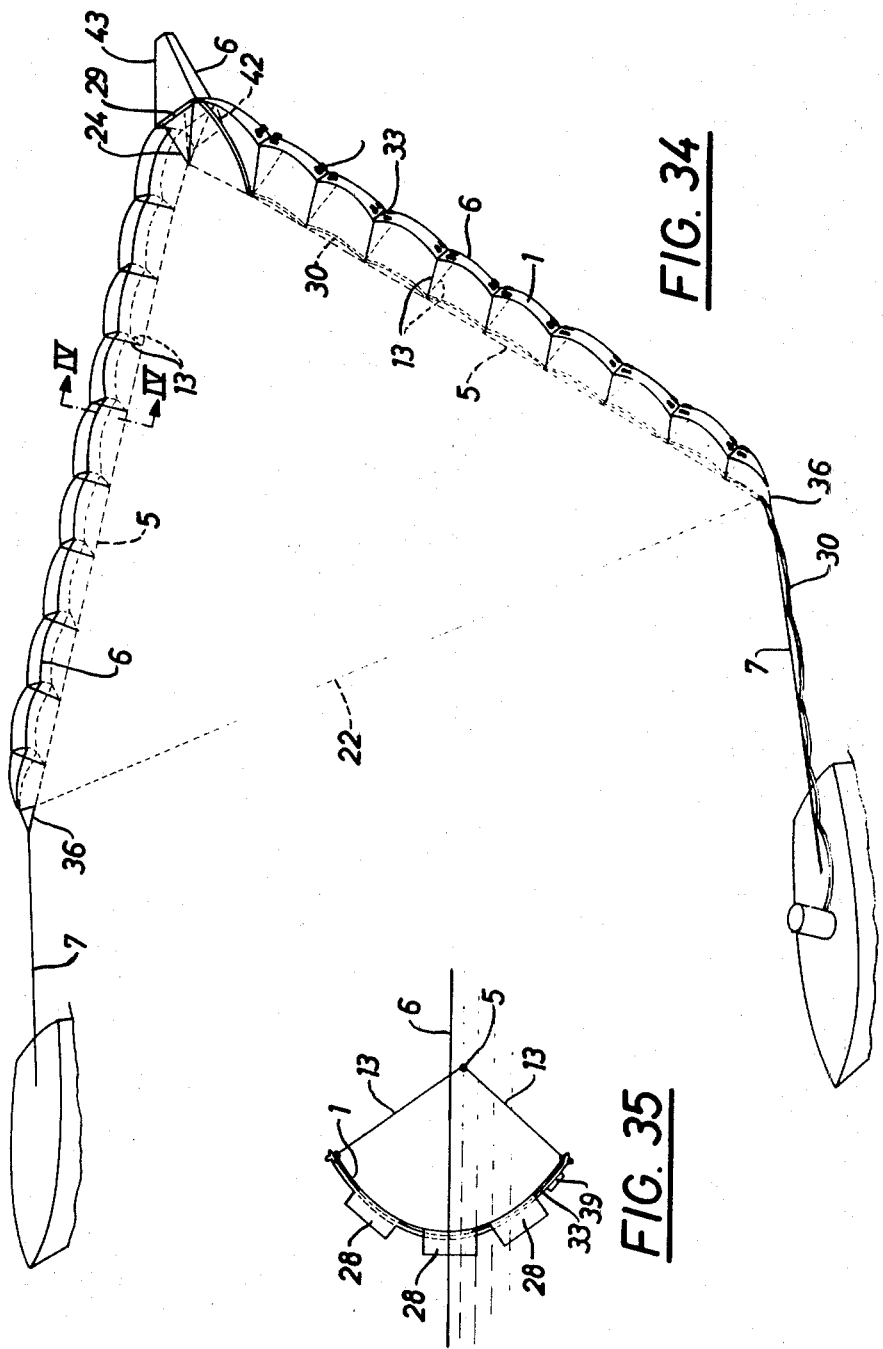

ARRANGEMENT IN FLEXIBLE FENCES FOR ENCLOSING IMPURITIES FLOATING ON WATER

The present invention relates to an arrangement in flexible slick confining booms for enclosing impurities floating on water.

The principal object of the invention is to provide a slick confining boom, the efficiency of which is relatively independent of the condition of the weather and water currents at the place, where it is going to be used. Another object is to provide a slick confining boom, which under working conditions is subjected to the smallest possible stresses, so that it will be cheap to manufacture.

The invention is substantially characterized by the slick confining boom being provided (equipped) with a stress relieving rope extending between its ends and connected with the slick confining boom at points situated between said ends.

Figure 9:
Figure 10:
Figure 11:
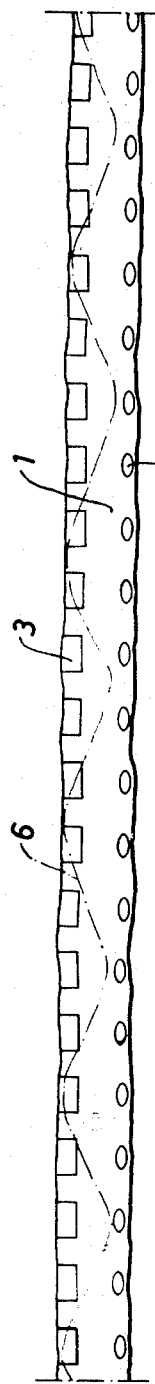
Figure 12:
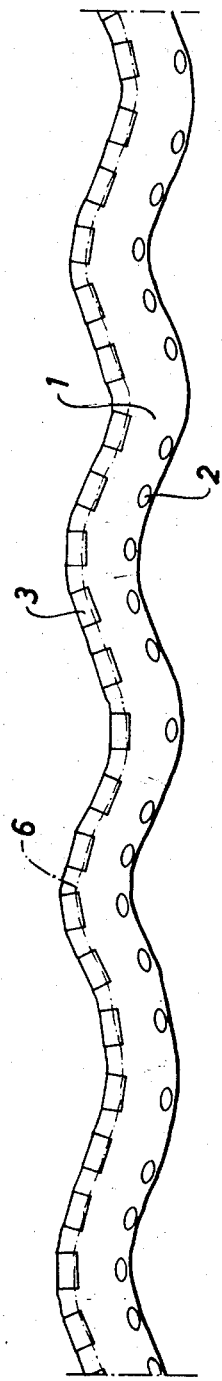
Figure 13:
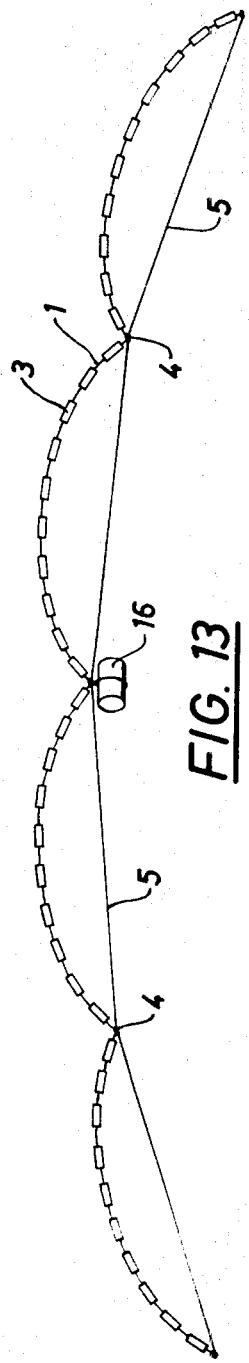
Figure 14:
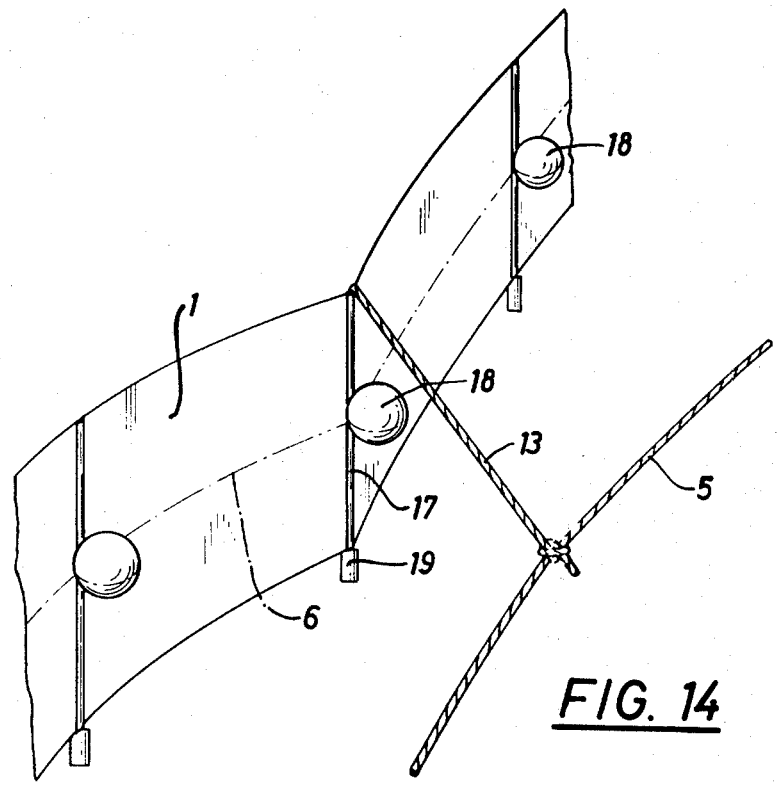
Figures 15, 16:
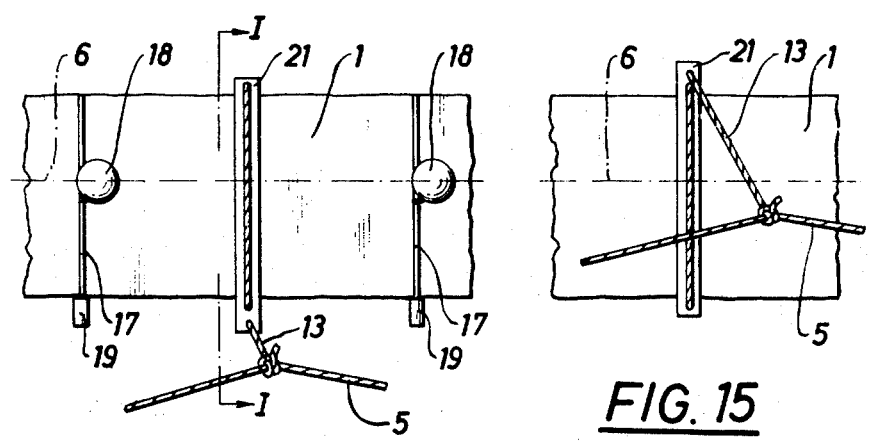
Figure 21:
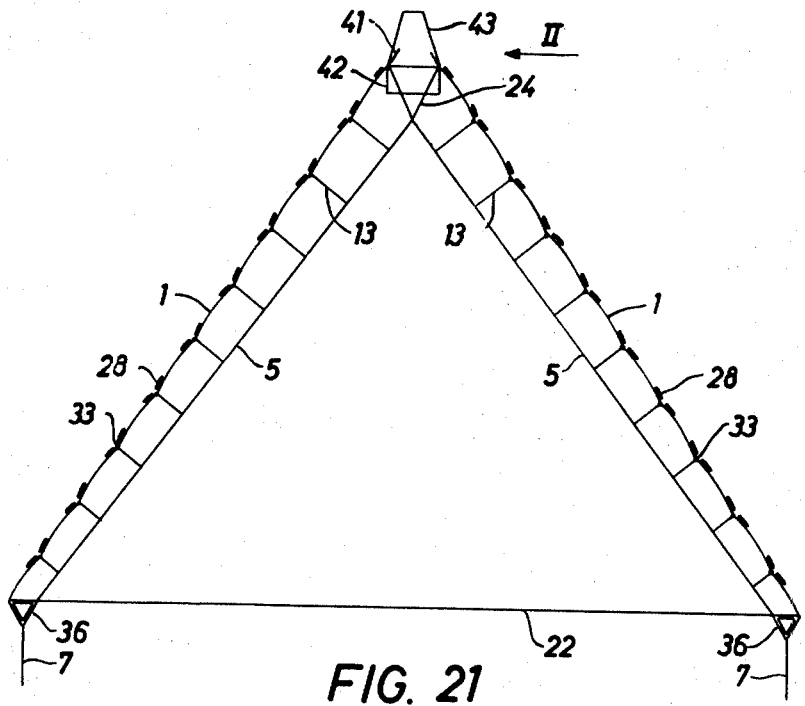
Figure 22:
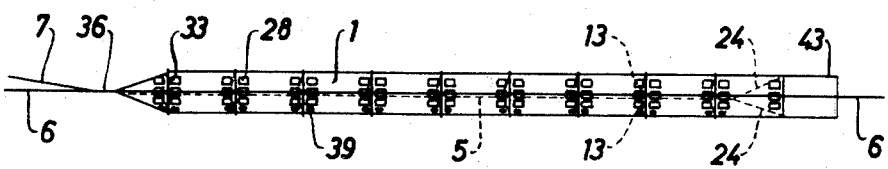
Figure 26:
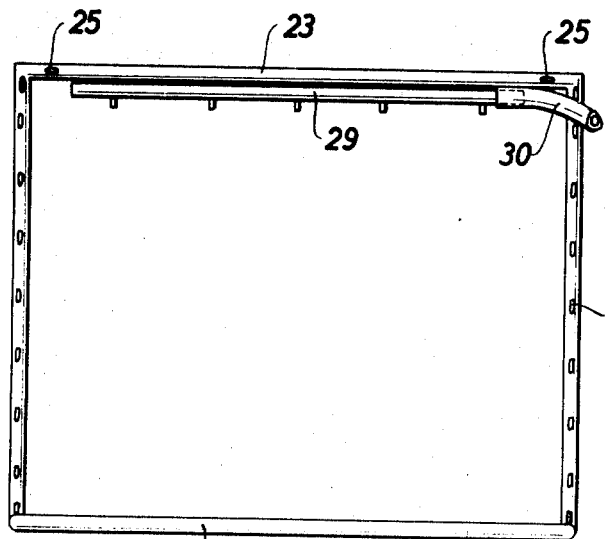
Figure 28:
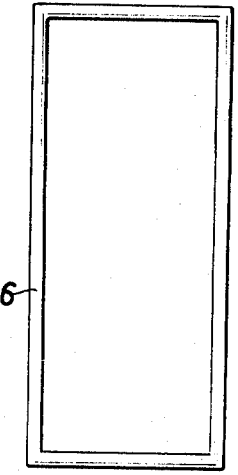
Figure 27:
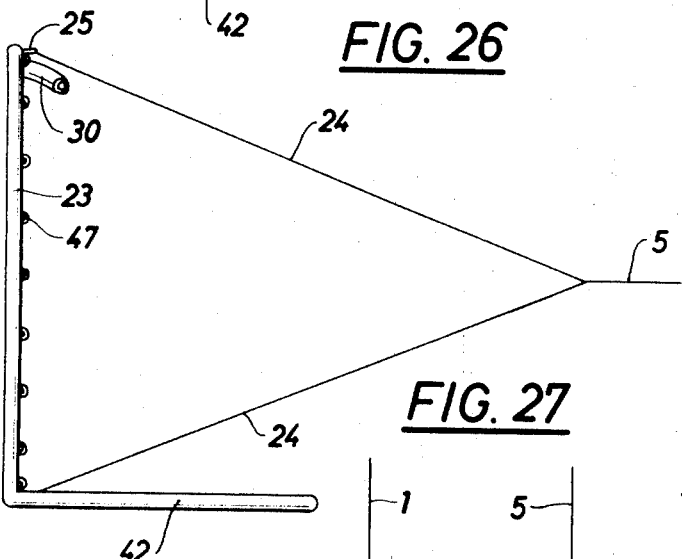
Figure 30:
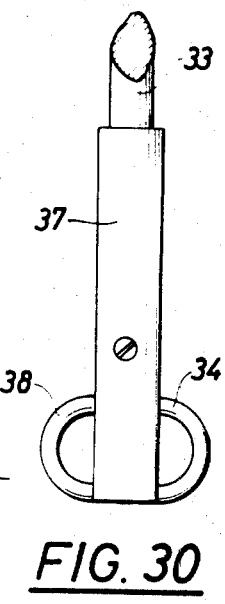
Figure 29:
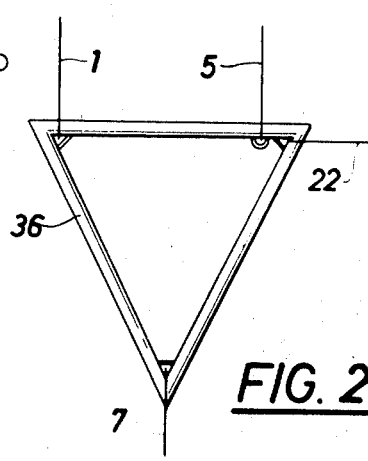
Figure 31:
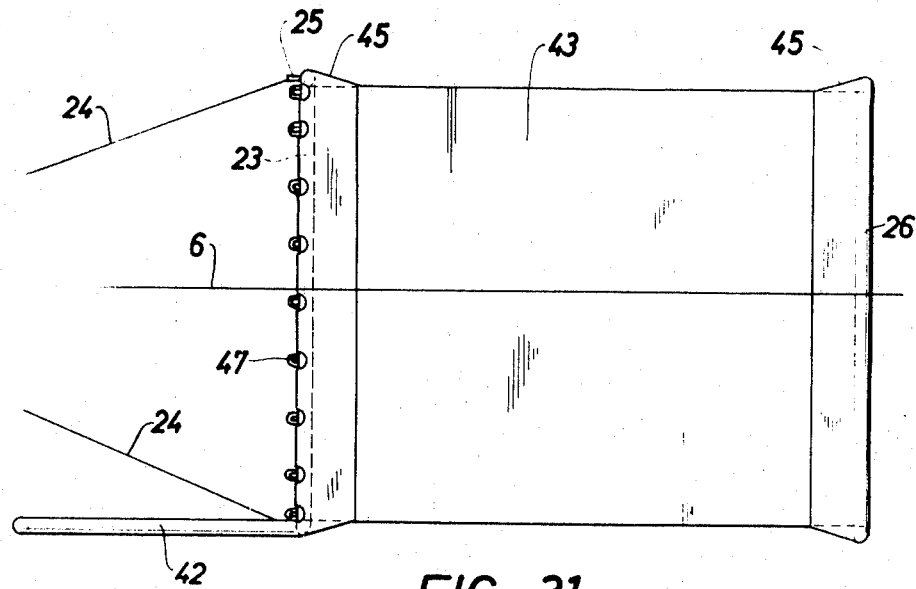
Figure 32:
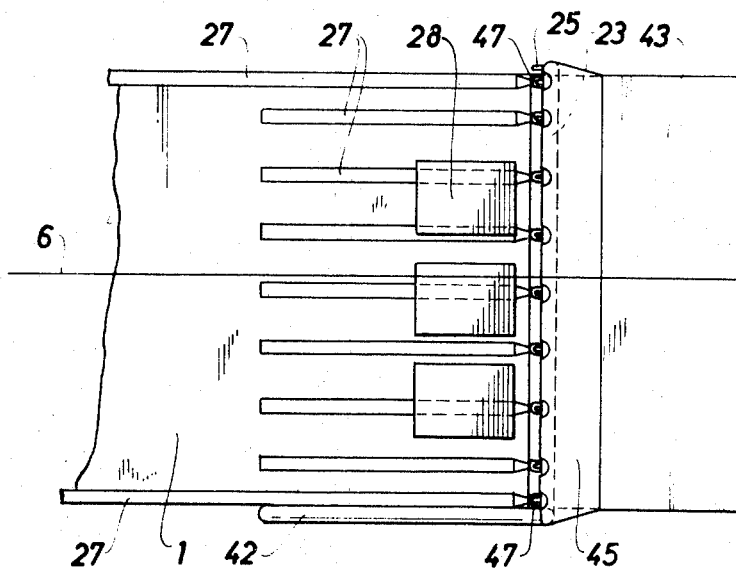
Figure 33:
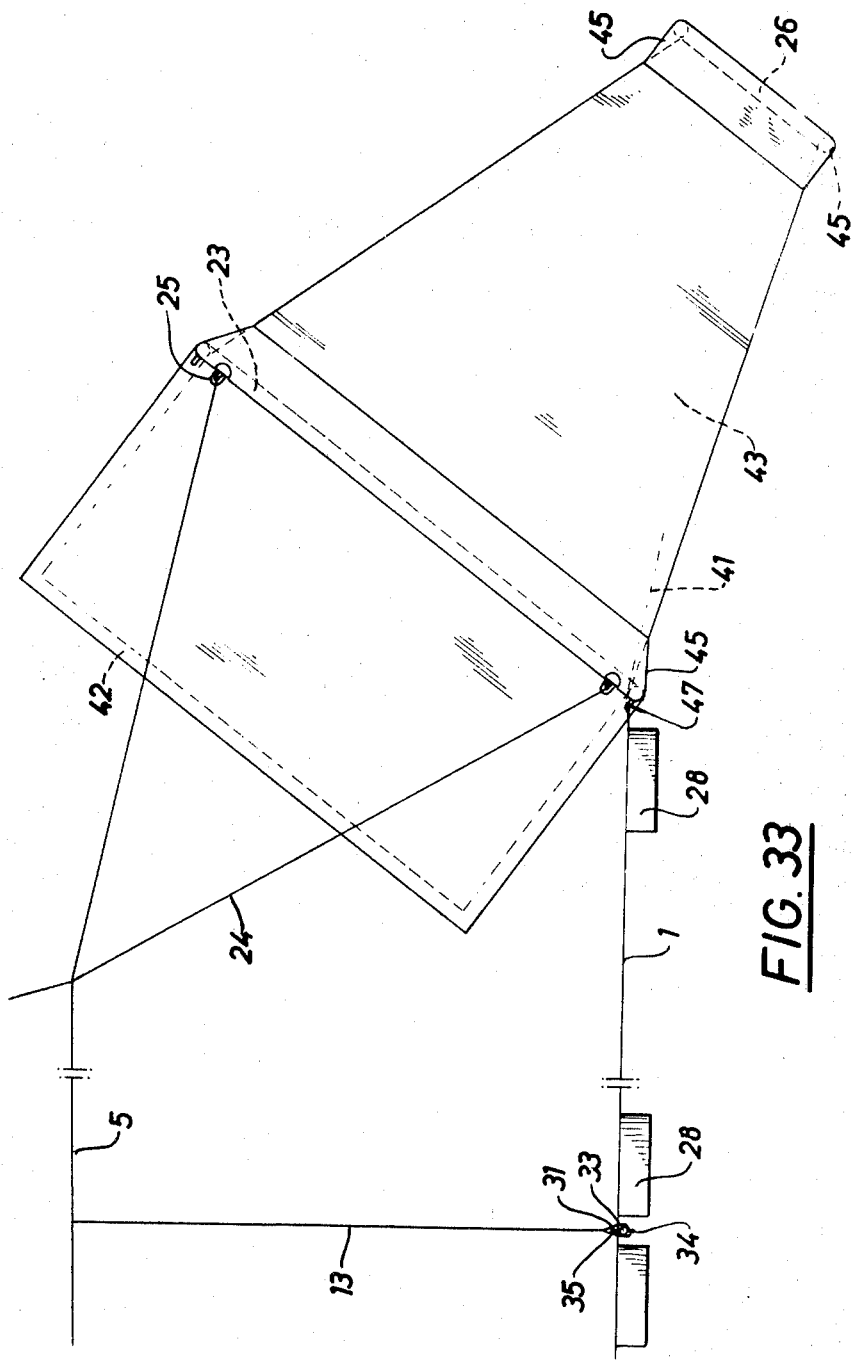

The invention will now be described more in detail below with reference to the accompanying drawings, in which:

FIG. 1 is a side elevational view of a slick confining boom made according to the invention, FIGS. 2 to 4 are views of details embodied in the boom assembly, FIG. 5 is a schematic top view of a boom, which is not equipped with the arrangement according to the invention and which is laid in water with strong current, FIG. 6 is a vertical cross section of the boom illustrated in FIG. 5, FIG. 7 is a top view corresponding FIG. 5 illustrating a boom, which is equipped with the arrangement according to the invention, FIG. 8 is a view corresponding FIG. 6 showing a vertical cross section through the boom illustrated in FIG. 7, FIG. 9 is a schematic top view of the boom illustrated in FIG. 5 and 6 in tow of a boat, FIG. 10 is a top view corresponding FIG. 9 of a boom equipped with the arrangement according to the invention, while it is being towed by a boat, FIG. 11 is a side elevational view of the boom illustrated in FIGS. 5, 6, and 9 in heavy sea, FIG. 12 is a view corresponding FIG. 11 showing a side elevational view of the boom made according to the invention in heavy sea, FIG. 13 is a top view of the boom illustrated in FIG. 12, FIG. 14 is a view of a portion of a boom, which somewhat differs in design compared with the boom illustrated in the preceding figures, FIGS. 15 to 19 illustrate a further variated embodiment, of which FIG. 15 illustrates an example how the stress relieving rope can be attached (fastened) to the boom, FIG. 16 shows another example of the fastening of the rope to the boom, FIG. 17 is a cross section substantially along the line 1—1 in the FIG. 16, FIG. 18 is a top view of the boom, FIG. 19 is a vertical section through the boom with the type of fastening of the stress relieving rope shown in FIG. 16, the boom being under the influence of strong wind, FIG. 20 is a view of a portion of a boom according to still another embodiment of the invention, FIGS. 21 to 35 illustrating yet another embodiment of a boom according to the invention, of which FIG. 21 is a top view of the boom, FIG. 22 shows the boom as seen from the right in FIG. 21, FIG. 23 is a side elevational view of a portion of the boom on an enlarged scale, FIG. 24 shows a second side portion of the same scale (as in FIG. 23), FIG. 25 is a cross section along the line 111—111 in FIG. 23, FIG. 26 is a view of the frame of a discharge opening made in the wall of the boom, FIG. 27 is a view of the same object illustrated in FIG. 26, but seen from the left, FIGS. 28 to 30 illustrate details entering into the boom assembly, FIG. 31 is a view in the direction of the arrow 11 in FIG. 21, the canvas of the boom having been removed, FIG. 32 is a side elevational view corresponding FIG. 31 with the canvas of the boom position, FIG. 33 illustrates on an enlarged scale a portion of the boom as a top view, FIG. 34 is a view of the boom as seen from above at an inclined angle, and FIG. 35 is a cross section through the boom along the line IV—IV in FIG. 34.

In the example of the embodiment illustrated in FIG. 1 the slick confining boom includes a separate body means of long extension consisting of a flexible material as for example canvas cloth 1 (fabric). At points along the lower edge portion of the canvas a number of sinking-weights 2 and at points along its upper edge portion a number of floats 3 are arranged. By means of a number of connecting organs 4 a number of identically alike boom portions are connected forming a boom of larger size (compound fence), in which the individual boom portions each one constitute a section. A tension means such as a stress relieving rope 5 extends between the ends of each one of the sections, said rope preferably having a specific weight of less than 1. The water level is indicated by the digit 6 with the portion of flexible material 1 below level 6 providing a depending skirt below the surface of a body of water and the portion of material 1 above level 6 providing an upwardly extending portion above said surface. The digit 7 indicates a terminal and tow wire (line) connected to the free end of the fence. The digit 8 indicates a number of holes taken up in the canvas, which holes are intended to serve the purpose of fastening points for supporting wires extending between the canvas and the stress relieving rope.

In FIG. 2 the connecting organ 4 located in the passage between two sections is shown on an enlarged scale. The connecting organ 4 has an H-shaped cross section, in which the free ends of the parallel legs of the H are of thicker dimensions, the reinforcements pointing in direction to each other. Said reinforcements are indicated with 9 in the drawings. As is evident from FIG. 4 the canvas 1 has a reinforced thicker end portion 10, said portions 10 of the canvas pieces 1 at adjacent ends (of the boom sections) being introduced into the channel shaped spaces of the connecting organ 4. The end portions of the canvas because of the thicker portions 9 are prevented from being torn loose from the connecting organ 4 in the longitudinal direction of the canvas. Locking means crosswise tranversing the walls of the connecting organ are indicated with 11, said locking means preventing the end portions 10 of the canvas to slip out of the connecting organ 4 in the longitudinal direction thereof. In FIG. 3 a suitable manner of fastening of the terminal and tow wire 7 to one of the connecting organs 4 located in the edge portions of the boom. In FIG. 5 a boom is illustrated, which is not provided with any stress relieving rope, which boom is laid in for example a river with a strong water current. The direction of the current is indicated with arrows and the river banks are indicated with 12. In FIG. 6 the same boom is illustrated in cross section. One can also see how the lower edge portion of the boom due to the current is tending to move upwards towards the surface 6 of the water, whereby oil can escape under and away from the boom along the inclined canvas wall 1. In FIG. 7 and 8 the same boom is illustrated, but equipped with a stress relieving rope 5. The addition the fence is connected with the stress relieving rope by means of tether means such as supporting wires 13, which at one end are fastened in the holes of attachment indicated with 8 in FIG. 1. The stress relieving rope is shorter than the boom itself and extends between the ends of said boom, to which it is connected by means of the terminal wires 7. The lower edge of the boom thereby is prevented from floating (being urged to move) upwards towards the surface 6 of the water, whereby impurities efficiently are prevented from escaping past the boom. In the way of laying out the fence illustrated in FIGS. 7 and 8 the stress relieving rope 5 is positioned at such a height that the pulling force in the supporting wires 13 is directed somewhat diagonally upwards. By means of a suitable location of the supporting wires 13 the boom can be brought to curve or bight in a desired manner, and moreover it will be subjected to much less tensile stress than in the example illustrated in FIG. 5.

In FIG. 9 a boom towed by a boat 14 is illustrated, which boom comprises an assembly of a number of smaller fence units, whereby the boom is not provided with any stress relieving rope. Then the stress on the connection between the tow wire 15 and the section of the boom positioned next thereto will correspond to total water resistance actuating upon all the sections. In FIG. 10 the same boom is shown as it is towed by the boat 14, whereby the boom is provided with the stress relieving rope 5. Then the total stress exercised by the water resistance will be taken up by the stress relieving rope, whereby each section of the boom only is subjected to the particular water resistance stress actuating upon that section. This arrangement brings with it many important advantages, among others the fact that the boom does not necessarily have to be so strongly dimensioned is in the case illustrated in FIG. 9.

In FIG. 11 a boom without stress relieving rope is shown in heavy sea and subjected to strong wind pressure. Hereby the pressure of the wind tends to press down the boom and stretch it so strongly that its floating capacity is considerably reduced, resulting in the cutting down into the waves and its efficiency being great reduced. In FIG. 12 the same boom is shown, but equipped with a stress relieving rope running through the coupling means between the sections of the boom. The length of the stress relieving rope can be dimensioned in relation to the motion of the sea, so that the various (different) sections of the boom remain comparatively slack. Hereby the stress relieving rope takes up the wind pressure actuating upon each individual section, and each section is subjected only to the wind pressure actuating thereupon. This brings with it the advantage that the boom gets very much improved properties in being able to follow the movements of the waves compared with what was the case in the example illustrated in FIG. 11. If the wind pressure actuating upon the couplings should get too strong, one can suitably attach additional float bodies 16, which by way of example may comprise small steel sheet barrels, plastic kegs or similar.

The arrangement described above is further suitable, when the boom is going to be brought home or pursed around leaked out oil. Hereby the stress relieving rope is used to haul in each individual section separately.

By detachably arranging the supporting wires at the boom as well as at the stress relieving rope, their length can easily be dimensioned according to desire, and it is likewise not necessary to attach said wires at the lower edge of the fence, but the height location of the point of attachment can be varied in a suitable manner according to the prevailing wind and current conditions.

In the FIGS. 14 to 18 examples of suitable ways of fastening of the stress relieving rope are illustrated in order to make possible variation of the height level of the point, where it is fastened to the fence. In FIG. 14 the supporting wire 13 is connected to the fence 1 at the upper end of a stiffening rod 17, which in addition supports for one part a float body 18 and for another part a sinking weight 19. The supporting wire 13 can also be fastened at another level along the rod 17 without parting from the fundamental idea of the invention. Said variation can also be suitable considering different wind and current conditions.

In FIGS. 15 to 19 the fence canvas is likewise indicated with the digit 1, the stress relieving rope with 13, the floats with 18, the sinking weights with 19, and the rods carrying the floats and sinking weights are indicated with 17. In contrast to the fence illustrated in FIG. 14 the supporting wires 13 are not fastened to the rods 17 but instead to so called laths 21 extending vertically in the fence, which laths in this case comprise flat organs made of comparatively rigid material and arranged on each side of the canvas 1 of the fence. Said laths 21 are tightly pressed to the canvas 1 by means of a supporting wire 13. In FIG. 17 one can best see how the supporting wire 13 is threaded through the laths, which in this particular case have two through bores in the lower portion and corresponding bore in the upper portion crosswise to the direction of the canvas whereby the supporting wire 13 keeps the laths in the position, in which they squeeze the canvas. By loosening the support wires at the laths 21 and swinging (pivoting) them parallelly to the canvas 1 the point of attachment (connection) can be moved from the lower position shown in FIG. 16 to the upper positions shown in FIG. 15.

In FIG. 20 the connecting organ 4 between two sections entering into the boom assembly, which has been described in detail above, is illustrated. As is evident from this figure the connecting organ is projecting out-side of the boom both at the top and the bottom. 46a and 46b indicate a lower stress relieving rope, and with 20a and corresponding 20b an upper stress relieving rope is indicated. In this case the stress relieving rope comprises a number of separate lengths extending between the connecting organs 4, which lengths are shorter than the respective sections. It is also conceivable that the stress relieving rope is fastened to only one of the 4 ends of the connecting piece without parting from the fundamental idea of the invention. Which one of the attaching points that can be considered most convenient for the stress relieving ropes 46a, 46b, 20a and 20b depends, as in the examples of embodiment described above, upon the prevailing wind and current conditions. It is also conceivable that the stress relieving rope can be fastened to different points between the ends of the connecting organ 4.

In the example of the embodiment illustrated in the FIGS. 21 to 35 it can for example be seen in FIG. 34 that a discharge outlet is arranged in the wall of the fence, through which leaked out (waste) oil and other impurities, which have been collected by means of the fence during its towing in the manner illustrated in FIG. 34, can be taken out to be delivered to means for removal transportation and/or destruction, which are located behind the fence as seen in its direction of towing. A distance wire 22 is extending between portions of the stress relieving rope located on both sides of the discharge opening, which distance wire maintains the two portions of the wall of the fence at a desired (predetermined) distance from each other. As is best evident from FIG. 21 the tow wires indicated with the digit 7 are connected to the free ends of the canvas of the fence and the stress relieving wire by means of a yoke 36, which maintains (keeps) the stress relieving rope 5 at a distance away from the wall 1 of the fence.

In the last mentioned example of embodiment the discharge opening is surrounded by a frame shaped stiffening organ 23, which can best be seen in FIG. 26. With the digit 47 a number of fastening points for the wall of the fence are indicated. The frame 23 of the opening is kept in place by means of a number of supporting wires 24. Said supporting wires part from a common point on the stress relieving rope 5 and are fastened to the frame 23 by means of fastening means 25. In this example of the embodiment the supporting wires 24 are shown attached to the frame 23 near its corners, but it is also here conceivable that they also can be attached at other point of the frame 23. In FIG. 27 is is clearly shown how the supporting wires 24 are fastened (attached) to the upper and lower portions of the frame. In FIG. 31 the digit 26 indicates a rear frame-shaped stiffening organ, the shape of which can best be seen in FIG. 28. Between these frame-shaped stiffening organs extends a tube-shaped passage 43 made or resilient material and being attached to the frames by means of mantles 45 enclosing around them. By the illustrated design of the frames 23 and 26 passage 43 gets a shape, which is tapering in backward direction in a wedgelike manner. In FIG. 31 said passage 43 is shown together with the supporting wires 24, the wall of the fence having been removed. In FIG. 32 the wall of the fence is shown attached to the front frame 23. The digit 27 indicates a number of reinforcement ribbons in the wall of the fence. The digit 28 indicates a number of float bodies, which are arranged in the longitudinal direction of the fence in inter spaced groups. The float bodies entering into each group are vertically spaced in the height direction of the fence in such a manner that at least part of the group is positioned above the surface 6 of the water, when the fence is subjected to normal stresses. Thereby the part of the group of float bodies, which is above the surface of the water, constitutes of a float reserve, which can be used when the canvas of the fence is subjected to abnormally great stresses. The digit 42 indicates a protruding bottom frame, which is carried by the front frame 23. Said bottom frame, however, is not necessary for the functioning of the fence. The digit 29 indicates a tube provided with a number of nozzles directed backwards, which is intended for spraying the impurities, which have passed through the discharge opening. The tube 29 can be connected by means of a hose to a towboat as shown in the FIG. 34.

The digit 33 indicates a number of springing laths extending in the cross direction of the wall of the fence, at the upper and lower ends of which the supporting wires 13 are attached by fastening means 34. The laths 33 in their turn are attached to the wall of the fence by means of fastening means 35. The digit 39 indicates a number of sinking weights arranged near the lower edge of the wall of the fence. The sinking weights and the float bodies can advantageously be placed near the laths 33, which best can be seen in the FIGS. 23 to 25.

In FIG. 29 one of the yokes 36 is shown on an enlarged scale by means of which yoke the towing wires 7 are coupled together with the stress relieving rope 5 and the wall 1 of the fence. In FIG. 30 the fastening means 37 for the supporting wires are shown on an enlarged scale, which fastening means are placed in the lower portion of the laths 33. Said fastening means comprise eyes 34. The digit 38 indicates eyes arranged at the opposite side for possible lashing of the fence. In the FIG. 33 one of the supporting wires 13 is shown laid in a loop 31 around one end of a lath 33. In FIG. 24 it can be seen that one of the reinforcement ribbons 27 at the free end of the wall of the fence is laid (placed) in the eye 40 for its fastening to the yoke 36. In FIGS. 21 and 33 the digit 41 indicates a tightening mantle extending into the discharge passage.

During the use of the fence according to the last mentioned embodiment the surface of the water is swept, whereby the impurities pass through the discharge opening, whereafter they either are pumped (suctioned) into a tank for transportation removal or are mixed with emulsifying or absorption additives. The absorption additive can for example be sprayed over the collected oil string at the discharge opening of the fence from a following boat. Also in the case, when the oil is pumped into a tank for transportation, this can be made from a following boat.

By the resilience of the laths the portion of the wall of the fence, which is positioned below the surface of the water, is reduced according to the increase of speed of the towing, the wall thereby curving out as is evident from the FIG. 35. By this curvature such currents are created in the water that the impurities do not pass (escape) below the wall of the fence.

The invention is not limited to the various embodiments above, which only are described by way of example, and which can be modified as to their details within the scope of the following claims without parting from the fundamental idea of the invention.

I claim:

1. A slick confining boom comprising:
   A. a separate body means, said body means being flexible and including:
      i. a depending skirt adapted to extend below the surface of a body of water and
      ii. an upwardly extending portion adapted to extend above the surface of a body of water;
   B. tension means adapted to carry tension loads on the boom and laterally spaced from said body; and
   C. tether means extending laterally away from said body to said tension means, so as to connect said body means to said tension means.

2. A slick confining boom comprising an elongated body means of flexible material having an upwardly extending portion adapted to extend above the surface of a body of water and a downwardly extending portion adapted to extend below said water surface, floats connected to and positioned along said upwardly extending portion of said body means, weights connected to and positioned along said downwardly extending portion of said body means, a stress relieving rope spaced laterally from said body means and adapted to relieve the stress on said body means when in a body of water, and a plurality of connecting means extending laterally from said body means and connecting only spaced apart portions of said body means to similarly spaced apart portions of said rope.

3. A slick confining boom as claimed in claim 2 wherein said connecting means consists of wires.

4. A slick confining boom as claimed in claim 3 wherein said wires are detachably connected to said body means and each wire has its portion between said body means and said rope adjustable as to its length.

5. A slick confining boom as claimed in claim 2 wherein said body means consists of a plurality of detachably connected sections.

6. A slick confining boom as claimed in claim 5 including rigid connecting members each having an H-shaped cross-sectional configuration with the parallel legs of the H at their ends being enlarged in a direction towards the opposing ends thereof and said sections having enlarged ends each inserted in the space between said connecting member legs.

7. A slick confining boom as claimed in claim 6 including locking means detachably mounted on said connecting members on each side of said section enlarged ends to prevent said sections from slipping longitudinally from said connecting members.

8. A slick confining boom as claimed in claim 6 wherein said rope is connected to the connecting members at opposite ends of said body means.

9. A slick confining boom as claimed in claim 6 wherein said connecting members extend vertically of said body means.

10. A slick confining boom as claimed in claim 6 wherein the portion of said rope which lies between adjacent connecting members is shorter than the corresponding section of said body means.

* * * * *